C. KING.
ELASTIC WHEEL TIRE.
APPLICATION FILED JUNE 21, 1907.

906,805.

Patented Dec. 15, 1908.

Witnesses
J. K. Moore
James Carroll

Inventor:
Charles King.

UNITED STATES PATENT OFFICE.

CHARLES KING, OF ISLEWORTH, ENGLAND.

ELASTIC WHEEL-TIRE.

No. 906,805.   Specification of Letters Patent.   Patented Dec. 15, 1908.

Application filed June 21, 1907. Serial No. 380,113.

*To all whom it may concern:*

Be it known that I, CHARLES KING, a subject of the King of Great Britain, residing at No. 12 The Grove, Isleworth, Middlesex, England, have invented new and useful Improvements in Elastic Wheel-Tires, of which the following is a specification.

This invention relates to elastic wheel-tires of the kind described in the specification of Patent No. 824844, and wherein a resilient body composed of elastic cords is wound upon a core and inclosed in an outer cover, the object of the invention being to render the repair of such a tire more simple and inexpensive than heretofore.

According to the present invention the resilient body and core, instead of being inclosed in a permanent cover which directly receives the wear and which, when worn out, requires renewal at a very considerable expense, has applied over it a relatively thin cover which is vulcanized on the resilient body and the tire so formed is inclosed in an outer jacket similar to that which is used in connection with an ordinary pneumatic tire and which, when it becomes worn, can be readily repaired or replaced. To fix this cover it is advantageous to make use of beaded rings or sections which are bolted or otherwise secured to the wheel faces and the beads of which engage with grooves or channels in the jacket, the tightening of the said rings or sections serving to pull the jacket tightly over the tire within it.

In order to prevent the inner tire from creeping relatively with the jacket cover, the said inner tire is preferably formed with circumferential corrugations and the interior of the jacket is formed with corresponding corrugations which interlock with those on the tire.

To enable the invention to be fully understood it will now be described by reference to the accompanying drawing, in which:—

Figure 1:
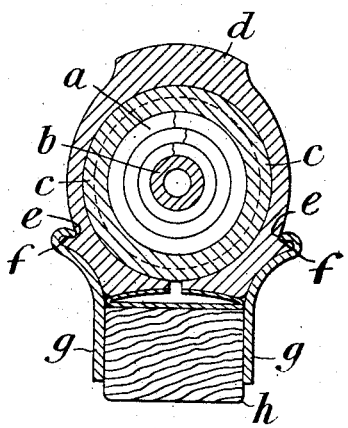
Figure 2:
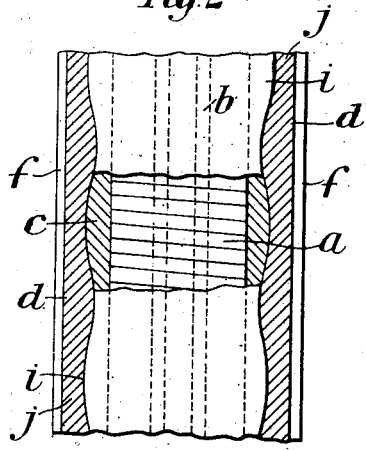

Figure 1 is a vertical section of an elastic wheel tire made according to the invention and shown in position on a wheel rim. Fig. 2 is a sectional plan view of the tire.

In the construction of tire illustrated in the drawing, $a$ represents the resilient body and $b$ the core thereof.

$c$ is the relatively thin cover which is vulcanized on to the resilient body $a$ and $d$ is the outer cover or jacket which is similar to that used in connection with an ordinary pneumatic tire and which is placed around the cover $c$ vulcanized upon the body. This cover $d$ is provided with the lateral grooves or channels $e, e$ which are adapted to be engaged by beads $f, f$ upon rings or sections $g$ secured to the felly $h$ of the wheel. By tightening these rings or sections $g$ the outer cover or jacket $d$ is pulled tightly over the tire which it incloses.

$i, i$ are the circumferential corrugations which are formed upon the outer surface of the inner jacket $c$ and $j, j$ are the corresponding corrugations formed upon the inner surface of the outer cover $d$ which engage therewith so as to prevent relative movement or creeping taking place between the outer cover $d$ and the tire it incloses.

Having now particularly described and ascertained the nature of my said invention and in what manner the same is to be performed, I declare that what I claim is:—

1. In an elastic wheel tire, the combination with a central core, an elastic body surrounding the core, an inner cover surrounding and integrally united with said elastic body, and a removable jacket surrounding said inner cover, the outer surface of said inner cover and the inner surface of the jacket being provided with interlocking portions for preventing the longitudinal creeping of one of said parts with respect to the other, substantially as described.

2. In an elastic wheel tire, the combination with a core of an elastic body wound spirally around said core, a relatively thin inner cover surrounding said elastic body and united integrally therewith and a removable outer jacket surrounding said inner cover, substantially as described.

3. In an elastic wheel tire, the combination with a core, of an elastic body wound spirally around said core, a relatively thin inner cover surrounding said elastic body and united integrally therewith and a removable outer jacket surrounding said inner cover, the outer surface of said cover and the inner surface of said jacket having interlocking portions extending entirely around the same for preventing the longitudinal creeping of one of said parts with respect to the other, substantially as described.

CHARLES KING.

Witnesses:
C. G. REDFERN,
E. E. DABBS.